(12) United States Patent
Onoda

(10) Patent No.: US 9,172,231 B2
(45) Date of Patent: Oct. 27, 2015

(54) ARRANGEMENT CONFIGURATION OF BUS BARS

(71) Applicant: YAZAKI CORPORATION, Minato-ku, Tokyo (JP)

(72) Inventor: Shinya Onoda, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/043,936

(22) Filed: Oct. 2, 2013

(65) Prior Publication Data

US 2014/0090872 A1    Apr. 3, 2014

(30) Foreign Application Priority Data

Oct. 3, 2012  (JP) ................................. 2012-221089

(51) Int. Cl.
*H01R 9/24* (2006.01)
*H02G 5/04* (2006.01)
*H01R 13/405* (2006.01)
*H01R 4/34* (2006.01)

(52) U.S. Cl.
CPC .. *H02G 5/04* (2013.01); *H01R 9/24* (2013.01); *H01R 13/405* (2013.01); *H01R 4/34* (2013.01)

(58) Field of Classification Search
CPC ........... H01R 9/24; H01R 13/405; H01R 4/34
USPC ....................... 174/68.2, 133 B; 439/766, 874
See application file for complete search history.

(56) References Cited

U.S. PATENT DOCUMENTS

| | | | | |
|---|---|---|---|---|
| 2,938,942 A | * | 5/1960 | Stanback et al. | 174/99 B |
| 4,002,388 A | | 1/1977 | Menocal | |
| 4,025,741 A | * | 5/1977 | Albert | 200/48 R |
| 4,159,504 A | * | 6/1979 | Cook | 361/650 |
| 4,358,633 A | * | 11/1982 | Reynolds, Jr. | 174/72 B |

FOREIGN PATENT DOCUMENTS

| | | |
|---|---|---|
| JP | 2000-069648 A | 3/2000 |
| JP | 2010-277985 A | 12/2010 |
| WO | 2011/096496 A1 | 8/2011 |

OTHER PUBLICATIONS

The Chinese office action letter issued on May 27, 2015 in the counterpart Chinese patent application.

* cited by examiner

*Primary Examiner* — William H Mayo, III
*Assistant Examiner* — Krystal Robinson
(74) *Attorney, Agent, or Firm* — Marvin A. Motsenbocker; Mots Law, PLLC

(57) ABSTRACT

In an arrangement configuration of bus bars including a plurality of bus bars having a connecting portion provided at a center portion thereof and a housing integrally molded while exposing the connecting portions of the plurality of bus bars, the bus bar has a pair of bending portions that is bent so that both edge sides come close to each other, the plurality of bus bars is arranged in parallel to each other so that the pair of bending portions is located adjacent to each other, and the housing is integrally molded so as to cover the pair of bending portions of each of the plurality of bus bars.

11 Claims, 4 Drawing Sheets

ARRANGEMENT CONFIGURATION OF BUS BARS

BACKGROUND OF THE INVENTION

1. Field of the Invention

The present invention relates to an arrangement configuration of bus bars.

2. Related Background of the Invention

Conventionally, as an arrangement configuration of bus bars, there has been known the one that includes a bus bar having a terminal connecting bolt provided at a center portion thereof, the terminal connecting bolt serving as a connecting portion constituting a fuse element, and a divided body serving as a housing integrally molded by an insertion molding while exposing the terminal connecting bolt of the bus bar (refer to the Patent Document 1 for example).

According to such an arrangement configuration of the bus bars, the divided body is integrally molded so as to cover both edge sides of the bus bar while exposing a peripheral portion of the terminal connecting bolt of the bus bar outside.

PRIOR ART DOCUMENT

Patent Document

[Patent Document 1] Japanese Patent Application Laid-Open Publication No. 2010-277985

SUMMARY OF THE INVENTION

Meanwhile, in such an arrangement configuration of the bus bars according to the above-described Patent Document 1, no other bus bars are arranged at both sides of the bus bar, but other bus bars can be arranged in parallel at the both sides of the bus bar to make the connecting portion multipolar.

However, if a plurality of bus bars is simply arranged in parallel to each other, an arrangement space for the plurality of bus bars is increased and a housing integrally molded with the plurality of the bus bars is increased in size accordingly.

Thus, it can be considered to reduce the bus bar itself in size to arrange the bus bars in parallel to each other. However, if the bus bar itself is reduced in size, an allowable current value of an electric current flowing through the bus bar is lowered, and thus a large amount of current cannot be applied.

Therefore, the present invention has an object to provide the arrangement configuration of the bus bars that can be reduced in size without lowering the allowable current value of the bas bar.

According to an aspect of the present invention, an arrangement configuration of bus bars includes a plurality of bus bars having a connecting portion provided at a center portion thereof and a housing integrally molded while exposing the connecting portions of the plurality of bus bars, wherein the bus bar has a pair of bending portions that is bent so that both edge sides come close to each other, the plurality of bus bars is arranged in parallel to each other so that the pair of bending portions is located adjacent to each other, and the housing is integrally molded so as to cover the pair of bending portions of each of the plurality of bus bars.

The present invention is preferably the arrangement configuration of the bus bars, in which a pair of bending portions each is bent with an inclined surface provided.

The present invention is preferably the arrangement configuration of the bus bars, in which the connecting portion is formed as a hole potion into which a stud bolt is inserted and the stud bolt is integrally molded with the housing.

DESCRIPTION OF THE PREFERRED EMBODIMENTS

With reference to FIGS. 1 to 6, the arrangement configuration of the bas bars according to the embodiment of the present invention will be described.

Figure 1:
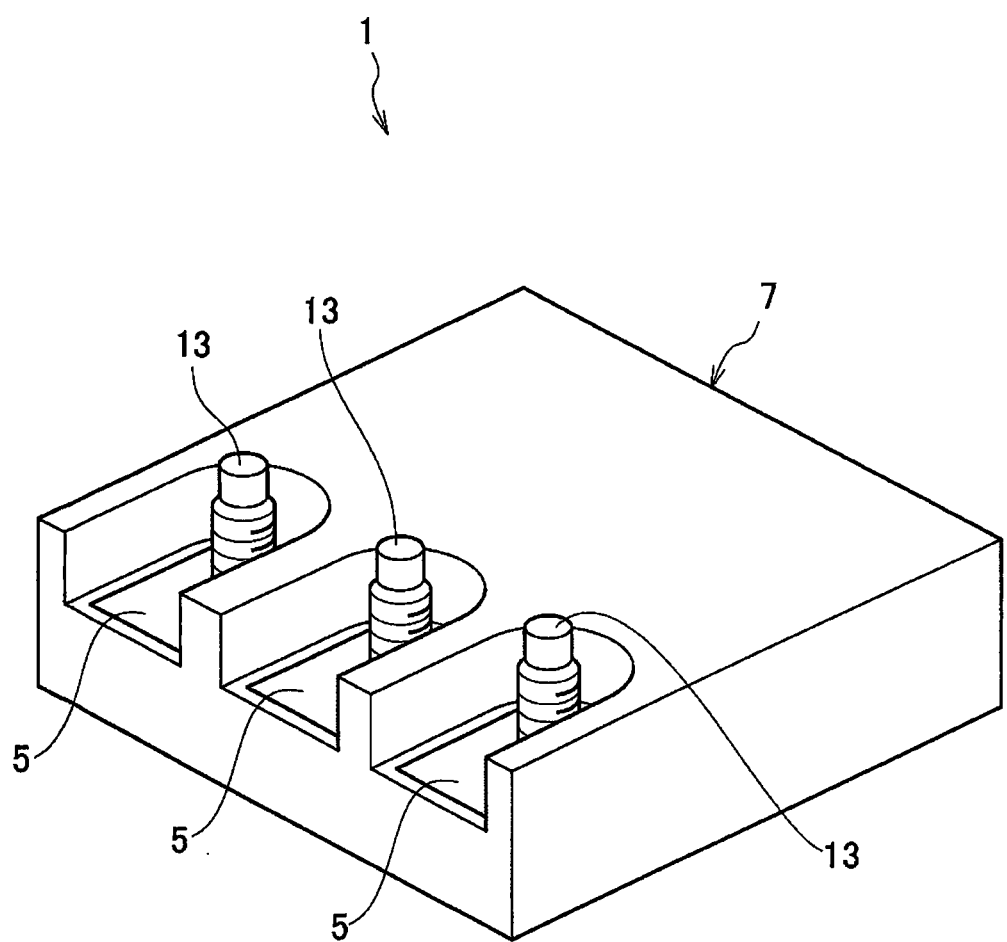
FIG. 1 is a perspective view of an arrangement configuration of bus bars according to an embodiment of the present invention.
Figure 2:
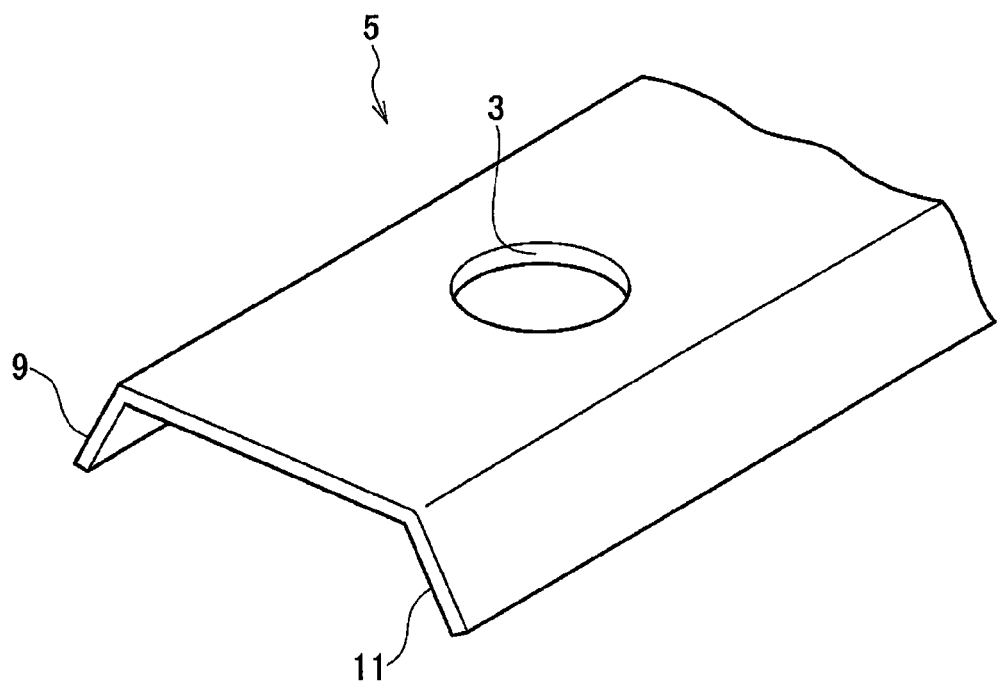
FIG. 2 is an enlarged view of the bus bar in the arrangement configuration thereof according to the embodiment of the present invention.
Figure 3:
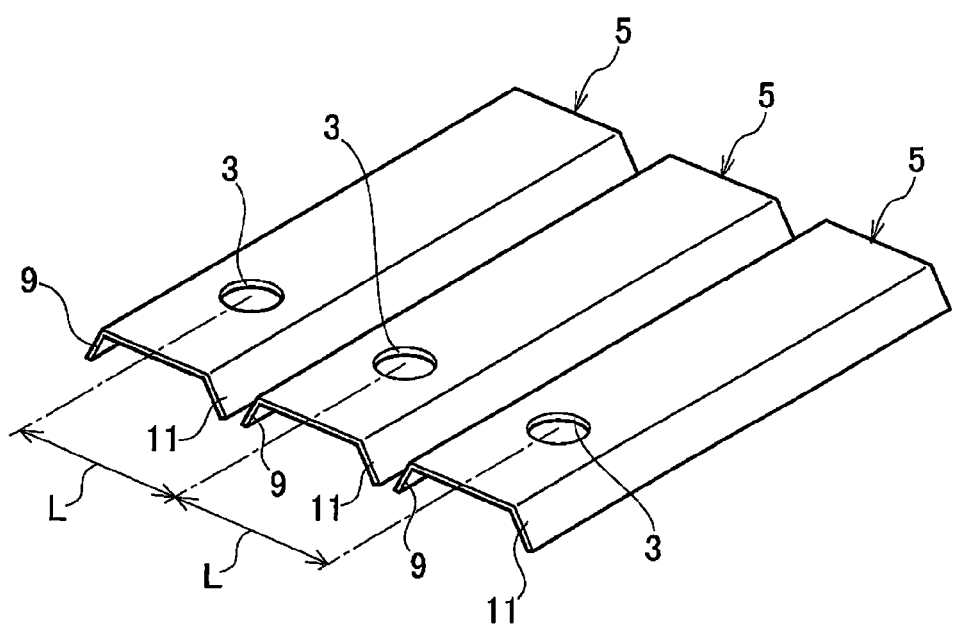
FIG. 3 is a perspective view illustrating a plurality of bus bars arranged in parallel to each other in the arrangement configuration thereof according to the embodiment of the present invention.
Figure 4:
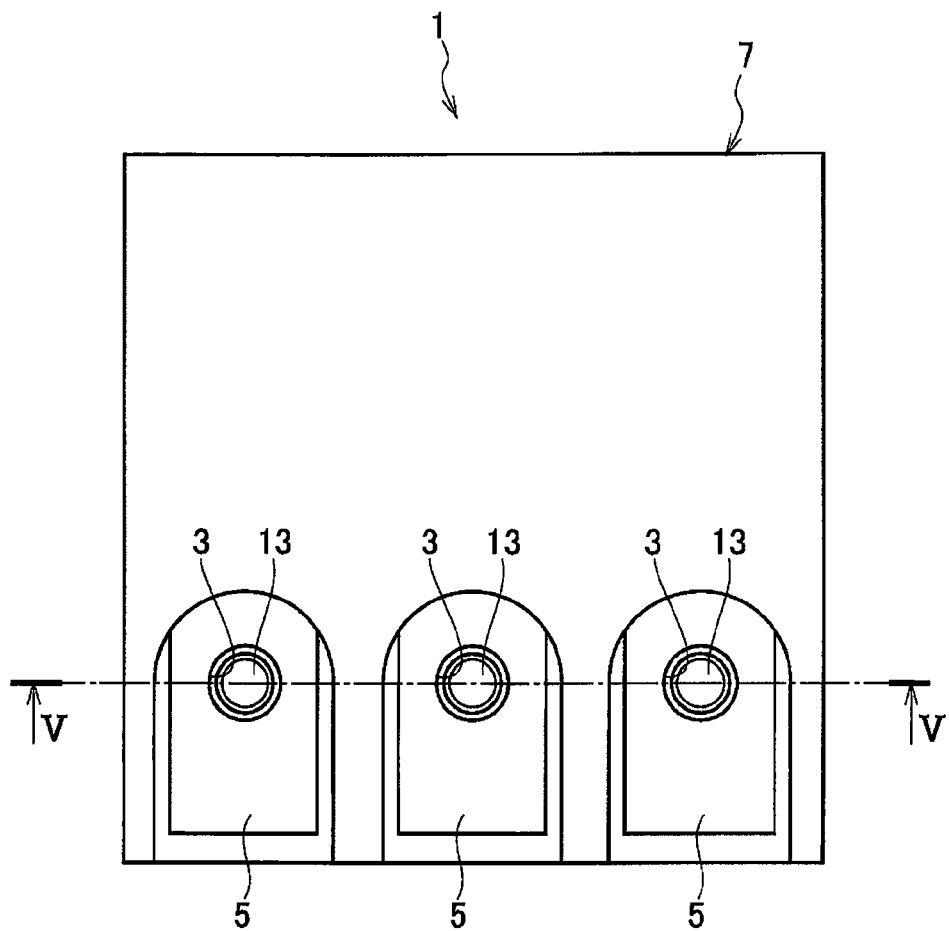
FIG. 4 is a top plan view of the arrangement configuration of the bus bars according to the embodiment of the present invention.
Figure 5:
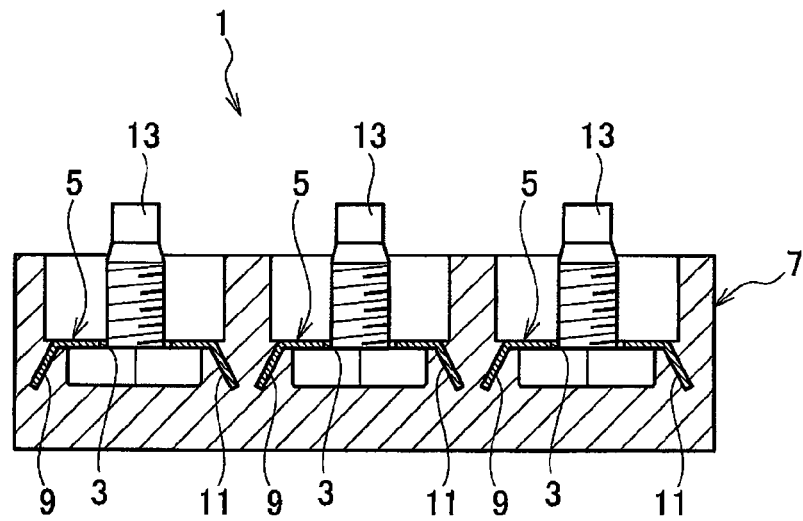
FIG. 5 is a cross sectional view taken along the line V-V of FIG. 4.

As illustrated in FIGS. 4 and 5, an arrangement configuration 1 of the bus bars according to the present embodiment includes a plurality of bus bars 5 each having a connecting portion 3 provided at a center portion thereof and a housing 7 integrally molded while exposing the connecting portion 3 of each of the plurality of bus bars 5.

The bus bars 5 each include a pair of bending portions 9, 11 that are bent to be located closely adjacent to each other at both edge sides, and the plurality of bus bars 5 are arranged in parallel to each other so that the pair of bending portions 9, 11 are located adjacent to each other, and the housing 7 is integrally molded to cover the pair of bending portions 9, 11 of each of the plurality of bus bars 5.

Further, the pair of bending portions 9, 11 is bent with an inclined surface provided.

Further, the connecting portion 3 is formed as a hole portion into which a stud bolt 13 is inserted, and the stud bolt 13 is integrally molded with the housing 7.

As illustrated in FIGS. 1 to 6, the bus bar 5 is made from conductive material and formed in a thin-plate shape. Further, the bus bar 5 is integrally formed with a fuse (not illustrated), and the plurality of bus bars 5 is integrally formed via the fuse to constitute a fuse element (not illustrated).

This bus bar 5 has the connecting portion 3 formed at the hole portion at the center portion thereof. The stud bolt 13 is inserted into the connecting portion 3, the bus bar 5 and the stud bolt 13 are electrically connected with each other, a connecting member (not illustrated) of another side, such as a terminal, is connected to the stud bolt 13 and, by combining them with the nut or the like, the bus bar 5 and the connecting member of the another side are electrically connected with each other.

Such bus bars 5 each include the pair of bending portions 9, 11 that is bent so as to come close to each other at the both edge sides at a predetermined inclined angle. The plurality of bus bars 5 (three bus bars 5 herein) each including the pair of bending portions 9, 11 is arranged in parallel to each other so that the pair of bending portions 9, 11 is located closely adjacent to each other.

As described above, the plurality of bus bars 5 is arranged in parallel to each other so that a length L between the connecting portions 3 of the adjacent bus bars 5 is reduced, thereby making an arrangement space of the plurality of bus bars 5 compact. The housing 7 is integrally molded so as to cover each of the pair of bending portions 9, 11 and head portions of the stud bolts 13 of the plurality of bus bars 5 while exposing the connecting portions 3 of the plurality of bus bars 5 outside.

The housing 7 is made from synthetic resin, and the plurality of bus bars 5 is arranged in parallel to each other therein. With the stud bolts 13 combined to the connecting portion 3, the housing 7 is integrally molded with the bus bars 5 and the stud bolts 13 by the insertion molding and the like.

In a state where the housing 7 is integrally molded with the plurality of bus bars 5, the housing 7 is in close contact with the inclined surfaces of the pair of bending portions 9, 11 of the plurality of bus bars 5. Therefore, a contact area of the housing 7 with the bus bars 5 is larger than that of the bus bars that do not include the pair of bending portions 9, 11, thereby improving absorption of heat generated when a current flows through the bus bars 5.

Figure 6:
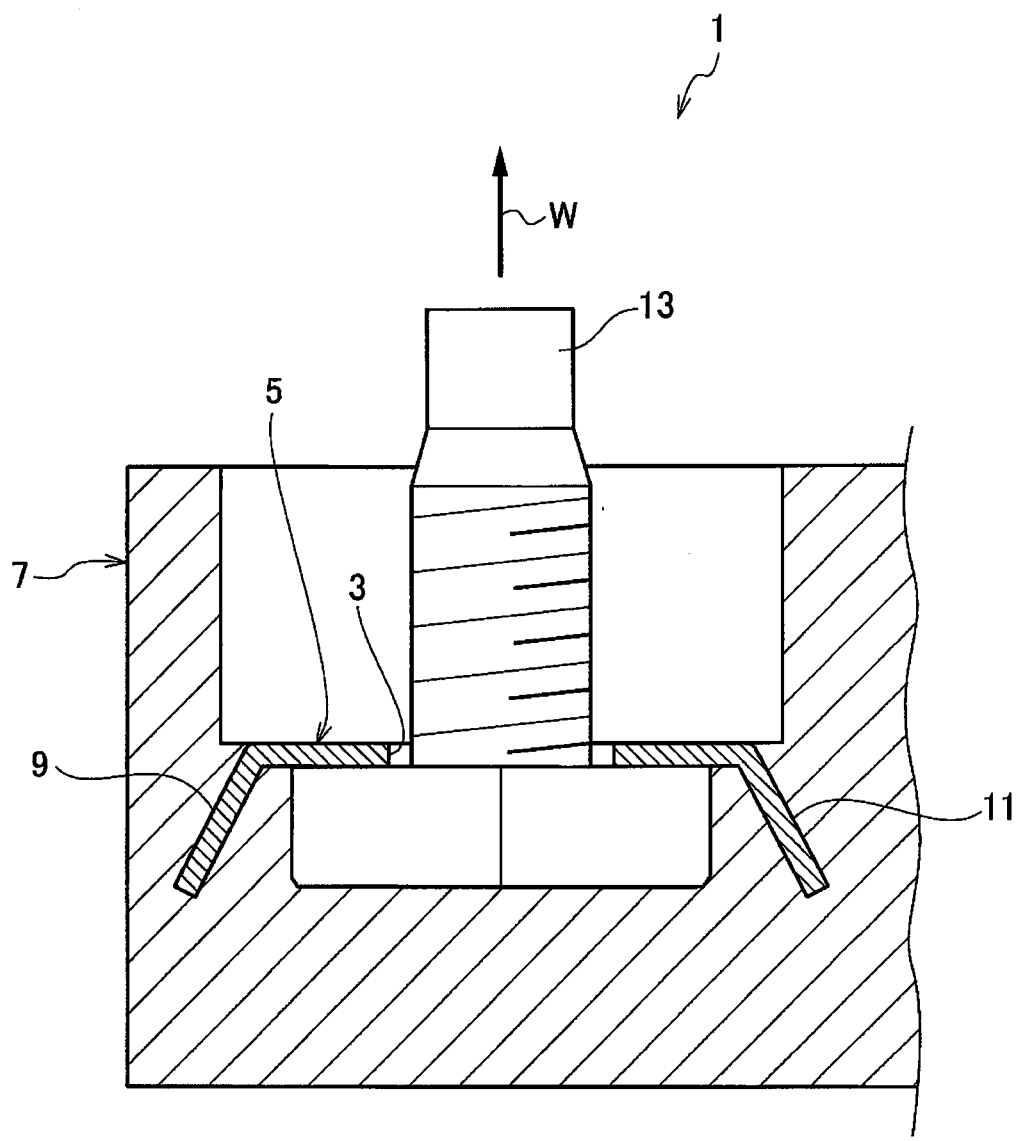
FIG. 6 is an enlarged view illustrating the arrangement configuration of the bus bar according to the embodiment of the present invention.

On the other hand, since the pair of bending portions 9, 11 is bent at the predetermined inclined angle with the inclined surface provided, a resistance against loading in a direction for leaving from an exposed portion of the housing 7 that is applied on the bus bar 5 and indicated with an arrow W in FIG. 6 becomes larger, thereby improving a retaining force of the bus bar 5. Therefore, even a thick large terminal, wiring or the like incurring great loading onto the connecting portion 3 can be connected to the connecting portion 3.

Since, in such an arrangement configuration 1 of the bus bars, the plurality of bus bars 5 is arranged in parallel to each other so that the pair of bending portions 9, 11 is located adjacent to each other, the length L between the connecting portions 3, 3 arranged in parallel to each other can be reduced to make the arrangement space of the plurality of bus bars 5 compact, thereby making the housing 7 compact. In addition, since the pair of bending portions 9, 11 is bent so that the both edge sides of the bus bars 5 come close to each other, the allowable current value of the bus bar 5 is never lowered.

Further, since the housing 7 is integrally molded so as to cover the pair of bending portions 9, 11 of each of the plurality of bus bars 5, the contact area of the housing 7 with the bus bars 5 becomes large, thereby improving the absorption of the heat generated when the current flows through the bus bars 5.

Therefore, in such an arrangement configuration 1 of the bus bars, even if the connecting portion 3 is made to be multipolar using the plurality of bus bars 5, the arrangement configuration 1 of the bus bars can be made compact without lowering the allowable current value of the bus bar 5.

Further, since the pair of bending portions 9, 11 is bent with the inclined surface provided, the resistance against the loading in the direction for leaving from the exposed portion of the housing 7 applied on the bus bar 5 can be increased, thereby improving the retaining force of the bus bar 5.

Furthermore, the connecting portion 3 is formed as the hole portion into which the stud bolt 13 is inserted and the stud bolt 13 is integrally molded with the housing 7, thus, the bus bars 5, the housing 7, and the stud bolts 13 can be handled as one member, thereby reducing the number of parts.

In the arrangement configuration of the bus bars according to the embodiment of the present invention, the pair of bending portions is downwardly bent, but it is not limited thereto and as long as the pair of bending portions and the housing can be integrally molded, the pair of bending portions may be upwardly bent.

The present application claims priority based on Japanese Patent Application No. 2012-221089 filed on Oct. 3, 2012, the entire contents of which are incorporated herein by reference.

INDUSTRIAL APPLICABILITY

The present invention can provide a compact arrangement configuration of bus bars without lowering an allowable current value of the bus bar.

DESCRIPTION OF REFERENCE NUMERALS 1 arrangement configuration of bus bars
3 connecting portion
5 bus bar
7 housing
9, 11 a pair of bending portions
13 stud bolt

What is claimed is:

1. An arrangement configuration of bus bars comprising: a plurality of bus bars having a connecting portion provided at a center portion thereof; and a housing integrally molded while exposing the connecting portions of the plurality of bus bars, wherein
the bus bar has a pair of bending portions that is bent so that both edge sides come close to each other,
the plurality of bus bars is arranged in parallel to each other so that the pair of bending portions is located adjacent to each other, and
the housing is integrally molded so as to cover the pair of bending portions of each of the plurality of bus bars and to contact with the pair of bending portions of each of the plurality of bus bars along a longitudinal direction of the plurality of bus bars in which the pair of bending portions extends.

2. The arrangement configuration of bus bars according to claim 1, wherein the pair of bending portions is bent with an inclined surface provided.

3. The arrangement configuration of bus bars according to claim 2, wherein the connecting portion is formed as a hole portion into which a stud bolt is inserted, and the stud bolt is integrally molded with the housing.

4. The arrangement configuration of bus bars according to claim 2, wherein the pair of bending portions is bent with an inclined surface such that a degree of inclination of the pair of bending portions is greater than 0 degrees and less than 90 degrees with respect to the center portion of the bus bars.

5. The arrangement configuration of bus bars according to claim 2, wherein the pair of bending portions is bent with an inclined surface such that a degree of inclination of the pair of bending portions is approximately 45 degrees with respect to the center portion of the bus bars.

6. The arrangement configuration of bus bars according to claim 2, wherein the pair of bending portions is bent with a degree of inclination such that a resistance against loading in a direction W away from the exposed portion of the housing is increased.

7. The arrangement configuration of bus bars according to claim 1, wherein the connecting portion is formed as a hole portion into which a stud bolt is inserted, and the stud bolt is integrally molded with the housing.

8. The arrangement configuration of bus bars according to claim 7, wherein the stud bolt is integrally molded with the housing such that a head portion of the stud bolt is covered by the housing while leaving other portions of the stud bolt exposed to an exterior.

9. The arrangement configuration of bus bars according to claim 1, wherein the pair of bending portions is bent upwardly with respect to the center portion.

10. The arrangement configuration of bus bars according to claim 1, wherein the plurality of bus bars is arranged in parallel to each other so that a length L between the connecting portions is reduced making an arrangement space of the plurality of bus bars compact.

11. The arrangement configuration of bus bars according to claim 1, wherein the housing is in close contact with the inclined surfaces of the pair of bending portions such that a contact area of the housing with the bus bars is increased and absorption of heat generated by current flowing in the bus bars is improved.

* * * * *